(12) United States Patent
Scaldaferri et al.

(10) Patent No.: US 8,564,273 B2
(45) Date of Patent: Oct. 22, 2013

(54) ANALOG CURRENT LIMIT ADJUSTMENT FOR LINEAR AND SWITCHING REGULATORS

(75) Inventors: Stefano Scaldaferri, Munich (DE); Christian Wolf, Gauting (DE); Eric Marschalkowski, Inning (DE)

(73) Assignee: Dialog Semiconductor GmbH., Kirchheim/Teck-Nabern (DE)

( * ) Notice: Subject to any disclaimer, the term of this patent is extended or adjusted under 35 U.S.C. 154(b) by 357 days.

(21) Appl. No.: 13/068,634

(22) Filed: May 16, 2011

(65) Prior Publication Data
US 2012/0268094 A1 Oct. 25, 2012

(30) Foreign Application Priority Data
Apr. 22, 2011 (EP) .................................... 11392003

(51) Int. Cl.
*G05F 5/00* (2006.01)
*G05F 1/565* (2006.01)

(52) U.S. Cl.
USPC ............................ 323/299; 323/284; 323/285

(58) Field of Classification Search
USPC .......... 323/225, 268, 271, 282, 284, 285, 299
See application file for complete search history.

(56) References Cited

U.S. PATENT DOCUMENTS

| | | | |
|---|---|---|---|
| 4,263,644 A | | 4/1981 | Zellmer |
| 4,727,308 A | * | 2/1988 | Huljak et al. ................. 323/222 |
| 6,297,617 B1 | | 10/2001 | Aoyama |
| 6,781,353 B2 | * | 8/2004 | Rozsypal ...................... 323/224 |
| 7,254,044 B2 | | 8/2007 | Perry et al. |
| 7,262,585 B2 | | 8/2007 | May |
| 7,414,377 B2 | | 8/2008 | Mayhew et al. |
| 8,254,044 B2 | | 8/2012 | Perry et al. |
| 2005/0162019 A1 | | 7/2005 | Masciarelli et al. |
| 2010/0026270 A1 | | 2/2010 | Yang et al. |
| 2011/0121801 A1 | | 5/2011 | Scaldaferri et al. |

OTHER PUBLICATIONS

European Search Report—11392003.7—2207 Mail date—Sep. 28, 2011.
"Fully Integrated Switch-Mode One-Cell Li-Ion Charger with Full USB Compliance and USB-OTG Support," Texas Instruments, www.ti.com, SLUS824A—Jun. 2008—Revised Jan. 2010 bq24150, bq24151, Copyright 2008-2010 Texas Instruments Incorporated, pp. 1-37 & addendum pp. 1-5.

* cited by examiner

*Primary Examiner* — Gary L Laxton
(74) *Attorney, Agent, or Firm* — Saile Ackerman LLC; Stephen B. Ackerman

(57) ABSTRACT

Circuits and methods for dynamic adjustment of the current limit of a power management unit to avoid unwanted automatic interruption of the power flow have been disclosed. The invention can be applied to switched and linear DC-to-DC converters. The power management unit is automatically adjusted to the output resistance of a power source (including interconnect resistance). The invention maximizes the time and hence the power transferred from a power management unit to the system (including the battery, in case of battery operated systems). The input current is reduced, thus increasing the input voltage in case of a high voltage drop across the internal resistance including interconnections between power source and power management unit.

13 Claims, 5 Drawing Sheets

ANALOG CURRENT LIMIT ADJUSTMENT FOR LINEAR AND SWITCHING REGULATORS

RELATED APPLICATIONS

This application is related to the following US patent application:

DS08-009B, titled "Automatic Current Limit Adjustment for linear and switching Regulators", Ser. No. 12/800,846, filing date May 24, 2010,
and the above application is herein incorporated by reference in their entirety.

BACKGROUND OF THE INVENTION (1) Field of the Invention

This invention relates generally to the field of DC-to-DC converters and relates more specifically to linear and switched DC-to-DC converters having a dynamic automatic input current limit control.

(2) Description of the Prior Art

DC-to-DC converters receive usually DC power from a source comprising a voltage source and an internal resistance. The resistance of a power source, comprising internal resistance and external resistance including the resistance of cables, is often unknown and may often not be neglected. Strong input currents of DC-to-DC converters can cause a substantial voltage drop across this internal resistance.

Every modern integrated power management system has to be able to accommodate for a broad range of voltage sources (USB, 5V wall adapter, Firewire, automotive battery). Each of them comes in a variety of output specs, in particular regarding nominal output voltage and maximum current capability. The power management unit (PMU) has to guarantee that in every circumstance the load seen by the power source is within the specified ranges. This is generally done imposing a current limitation on the PMU according to the kind of power source connected to it.

Even respecting this limitation, an excessive length of the connection cable or a low quality power source can lead the PMU input voltage to fall below a lower threshold specified by the specific power source. In this case the power path between the power source and the system is disabled, as shown in FIG. 1 prior art. Here a general battery operated system has been represented as an $I_{CHG}$ load (current required to charge the battery) and an $I_{SYS}$ load (current required for system operation of an electronic device).

Many DC-to-DC converters use a voltage comparator 1 to detect an input power source. In case an input voltage is higher than a threshold reference voltage an input power source is identified and subsequently an input current is admitted via a switch. In case a substantial voltage drop, caused by a the resistance of a power source ($R_{out}+R_{cable}$) and a strong input current, can be so high that the input voltage $V_{in}$ is lower than a threshold reference voltage and the input current is switched off. Subsequently without voltage drop the input voltage increases, an input voltage is admitted again and the input of the DC-to-DC converter starts to toggle, which is not acceptable.

The behavior of an architecture shown in FIG. 1 prior art is not robust: even a load current below the current limit can interrupt the power flow and cause start-up or operation failures. This situation would occur for example when charging the battery with full current (i.e. 1 A) connecting the power supply with long cables having a resistance in the order of Ohms.

There are patents or patent publications dealing with the operation of DC-to-DC converters:

U. S. patent (U.S. Pat. No. 7,262,585 to May) discloses a power supply system having a transistor, a linear regulator, a DC-DC converter, and a control circuit. The transistor has an input, a substrate, a first node, and a second node. The first node is operably coupled to a non-battery power source. A linear regulator is operably coupled to the second node to produce a regulated output voltage based on the non-battery power source, when enabled. A DC-DC converter is operably coupled to produce the regulated output voltage based on a battery power source, when enabled. A control circuit is operably coupled to the input node and the substrate of the transistor wherein when the DC-DC converter is enabled, the control circuit controls a reverse leakage current of the transistor, and when the linear regulator is enabled in a zero load-state, the control circuit controls a forward leakage current of the transistor, and when the linear regulator is enabled in a non-zero load-state, the control circuit provides a current limit for the linear regulator.

U.S. patent (U.S. Pat. No. 7,254,044 to Perry et al.) proposes various embodiments of a power supply all including at least one DC/DC converter. The converter includes a primary switch controlled by a pulse width modulated control signal such that the primary switch is on for a D time period of each switching cycle of the converter and is off for a 1-D time period of each switching cycle. Also, the power supply includes a current sensing element connected in series with the primary switch. In addition, the power supply includes a current limit circuit connected to the current sensing element. The current limit circuit includes a functional circuit having a first input responsive to a first signal whose voltage is proportional to the output current of the converter during the D time period of the switching cycle of the converter. A second input of the functional circuit is responsive to a second signal whose voltage is proportional to the output current of the converter during the 1-D time period of the switching cycle of the converter. In that way, the voltage of the output signal of the functional circuit is proportional to the output inductor current of the converter over both the energy storage phase (the D interval) and the energy deliver phase (the 1-D) interval of the converter.

U.S. Pat. No. (4,263,644 to Zellmer) discloses a switched DC-to-DC converter in a power supply being powered by input line current from an external power source and driven by voltage pulses from a variable duty cycle pulse width modulator for converting a DC input voltage to a DC supply voltage of a different value that is applied to a load impedance. A comparator monitors the supply voltage for producing an error voltage that biases the modulator for adjusting the width of the voltage pulses, and thus the duty cycle of the converter, for maintaining the supply voltage relatively constant. An RC circuit integrates the voltage pulses for producing an indication of the average value thereof, which is directly related to the value of line current drawn by the converter. When the average value of voltage pulses exceeds a reference voltage, the value of bias voltage is limited for establishing the maximum width of voltage pulses and duty cycle of the converter, and thereby limit the maximum line current drawn by the power supply.

U.S. Pat. No. (7,414,377 to Mayhew et al.) describes a motor controller system comprising solid-state switches for connection between an AC line and motor terminals for controlling application of AC power to the motor. A sensor senses AC line voltage. A control circuit controls operation of the solid-state switches. The control circuit ramps switch current during a start mode and selectively holds switch current during the start mode if sensed voltage drops below a threshold amount.

Furthermore Texas Instruments has published an application note "Fully Integrated Switch-Mode One-Cell Li-Ion Charger with Full USB compliance and USB-OTG support" describing a charge management device for single cell batteries, wherein charge parameters can be programmed through an I²C interface. The bQ24150/1 charge management device integrates a synchronous PWM controller, power MOSFETs, input current sensing, high accuracy current and voltage regulation, and charge termination, into a small WCSP package.

SUMMARY OF THE INVENTION

A principal object of the present invention is to achieve a power management unit avoiding undesired automatic interruption of input power flow.

A further object of the present invention is to achieve a power management unit adapting automatically to an internal resistance, including resistance of interconnections, of a power source.

A further object of the present invention is to achieve a power management unit maximizing the power transferred from the power management unit to a system load (including a battery in case of battery operated systems).

In accordance with the objects of this invention a method for dynamic adjustment of a current limit of a power management unit has been achieved. The method invented comprises, first, comprising the following steps: (1) providing a power management unit comprising a control unit, voltage comparing means, current comparing means, and a current source, (2) connecting a power source to the power management unit, and (3) setting a maximal allowable input current limit to a default value. Furthermore the method invented comprises: (4) enabling power transfer between a power source and a load if the input voltage is higher than a threshold voltage and there is sufficient overhead between input voltage and output voltage, (5) checking if an input voltage is lower than a defined threshold voltage $V_{in\_low}$ and, if so, go to step (6), else repeat step (5), and (6) checking if there is sufficient overhead between input voltage and output voltage if so, go to step (7), otherwise go to step (8). Finally the method invented comprises the steps of: (7) reducing input current limit and go to step (5), and (8) disabling the power management unit.

In accordance with the objects of this invention a power management unit enabled for dynamic adjustment of an input current limit has been achieved. The power management unit comprises, first, a first voltage comparator, comparing an input voltage of the power management unit with a threshold voltage, wherein its output is used by a means of setting dynamically a maximum input current limit, a second voltage comparator, comparing an output voltage of the power management unit increased by an overhead voltage with said input voltage wherein its output is used by said means of setting dynamically a maximum input current limit, and a current comparator, comparing said input current with a reference current wherein its output is an input to said means of setting dynamically a maximum input current limit. Furthermore the power management unit comprises a means to limit said input current controlled by said means of setting dynamically a maximum input current limit, and said means of setting dynamically a maximum input current limit, wherein said maximum current limit depends upon the outputs of said first and second voltage comparators.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to achieve a power management unit, i.e. transferring power from a power source to a system/battery) even in presence of power sources having low quality and high output resistance and/or high resistive cables. The present invention is applicable to switched DC-to-DC converters as well as to linear converters such as e.g. low drop-out (LDO) converters.

Figure 2:
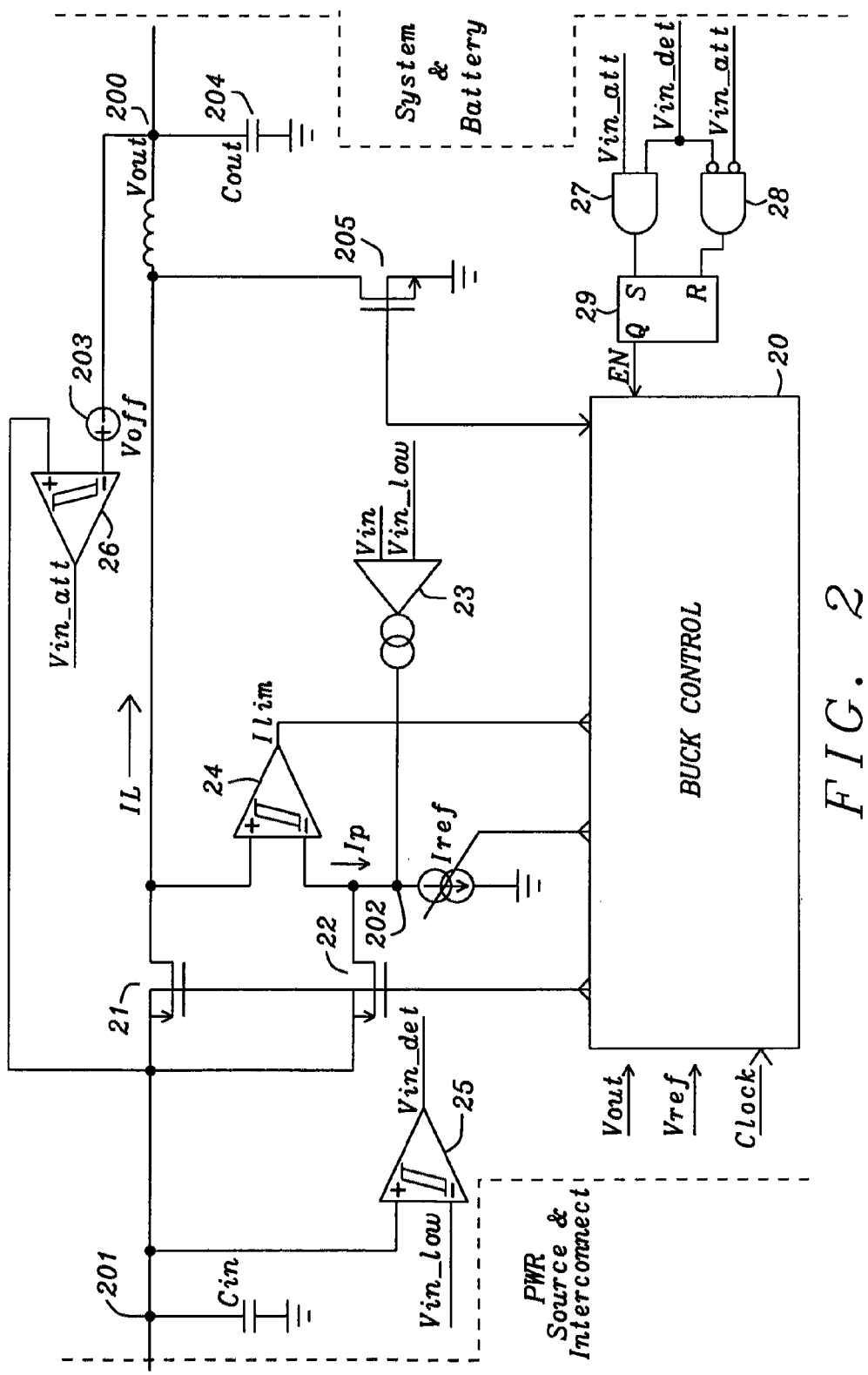
FIG. 2 illustrates a circuit of a dynamic current limit control scheme of the present invention.

The dynamic current limit control scheme of the present invention is depicted in FIG. 2. FIG. 2 shows a power path of a power management unit. In a preferred embodiment of the invention a current limited buck voltage regulator is used for converting DC/DC power but this is not limiting the scope of the present invention, which would be applicable also to a linear regulator as e.g. an LDO.

The output port 200 is connected to a system and/or a battery; the input port 201 is connected to a power source via an interconnection.

The buck converter shown limits a current cycle-by-cycle. According to the kind of power source connected to the input, the buck control 20 sets a reference current $I_{ref}$ limiting a peak current through the main switch 21 to a value $I_{limit}=M*I_{ref}$, wherein M is the ratio of size of main switch 21 to the size of a matched reference device 22.

Assuming for the moment the gm-amplifier 23 has its output disconnected, then as soon as the current in the main switch 21 exceeds $I_{limit}=M*I_{ref}$, the comparator 24, comparing the current through the main switch 21 with the current $I_p$, will toggle forcing the buck control 20 to turn-off the main switch 21, hence preventing the input current to increase.

The current $I_p$ is defined by $$I_p = I_{ref} + g_m \times (V_{in} - V_{inlow}),$$

wherein $I_{ref}$ is the reference current set by the buck control block 20, $g_m$ is the transconductance of the $g_m$-amplifier 24, and $(V_{in}-V_{inlow})$ is the differential input voltage of $g_m$-amplifier 24 and signifies a difference between the actual input voltage $V_{in}$ and a threshold value $V_{inlow}$ of the input voltage.

If the current in the main switch 21 is below the programmed current limit $I_{limit}$ but a high voltage drop on the connections cable and/or the power source output resistance causes the input voltage $V_{in}$ of the power management unit to fall below a detection threshold $V_{in\_low}$, the power converter of the present invention will not be disabled as in the architecture of shown in FIG. 1 prior art.

In summary, the present invention is characterized by deploying detect comparator 25, the attach comparator 26 and the logic circuit formed by AND-gate 27, inverted AND-gate 28 and SR-latch 29 in order to achieve 1. the power transfer between the power source and the system/battery to be enabled as soon as the input supply voltage exceeds the minimum input voltage level $V_{in\_low}$ specified for the power source and there is sufficient overhead between input voltage $V_{in}$ and output voltage $V_{out}$, and
2. the buck converter will be only disabled if input voltage $V_{in}$ falls below the detection threshold $V_{in\_low}$ and there is not sufficient headroom between input voltage $V_{in}$ and output voltage $V_{out}$.

In case the input voltage $V_{in}$ falls below the detection threshold $V_{in\_low}$ but there is still enough margin, i.e. output voltage $V_{out}$, to deliver power to the system, the buck converter is not disabled and gm-amplifier 23 pushes current into node $V_{sw\_ref}$ 202, thus effectively reducing the input current limit of the buck converter and hence increasing the input voltage $V_{in}$ due to a lower voltage drop at the interconnection to the power source and at the internal resistance of the power source. It should be noted that the gm-amplifier 23 can only generate current, i.e. it doesn't affect the circuit operation when input voltage $V_{in}$ is greater than detection threshold voltage $V_{in\_low}$. Transistor switch 205 is used for rectifying the output of the buck converter.

The control-loop described stabilizes the input voltage within a range $dV=I_{REF}/gm$ below the detection threshold voltage $V_{in\_low}$. In order to restore the input voltage $V_{in}$ by reducing the current limit, the gm-amplifier 23 has to be faster than the RC time-constant given by the input resistance and the input capacitance $C_{in}$.

The buck converter will still deliver power to the load as long as the input voltage $V_{in}>V_{out}+V_{off}$. The attach comparator 26 compares the input voltage $V_{in}$ with the voltage $V_{out}+V_{off}$.

$V_{off}$ is the minimum voltage required at the drain-source voltage of the pass device 21 to operate correctly. A margin is required for $V_{off}$ to compensate the offset of the comparator. In any case $V_{off}$ must never be negative.

Only in case of real disconnect of the power source the output of the attach comparator 26 output will go to 0, causing the shutdown of the buck converter.

Figure 3:
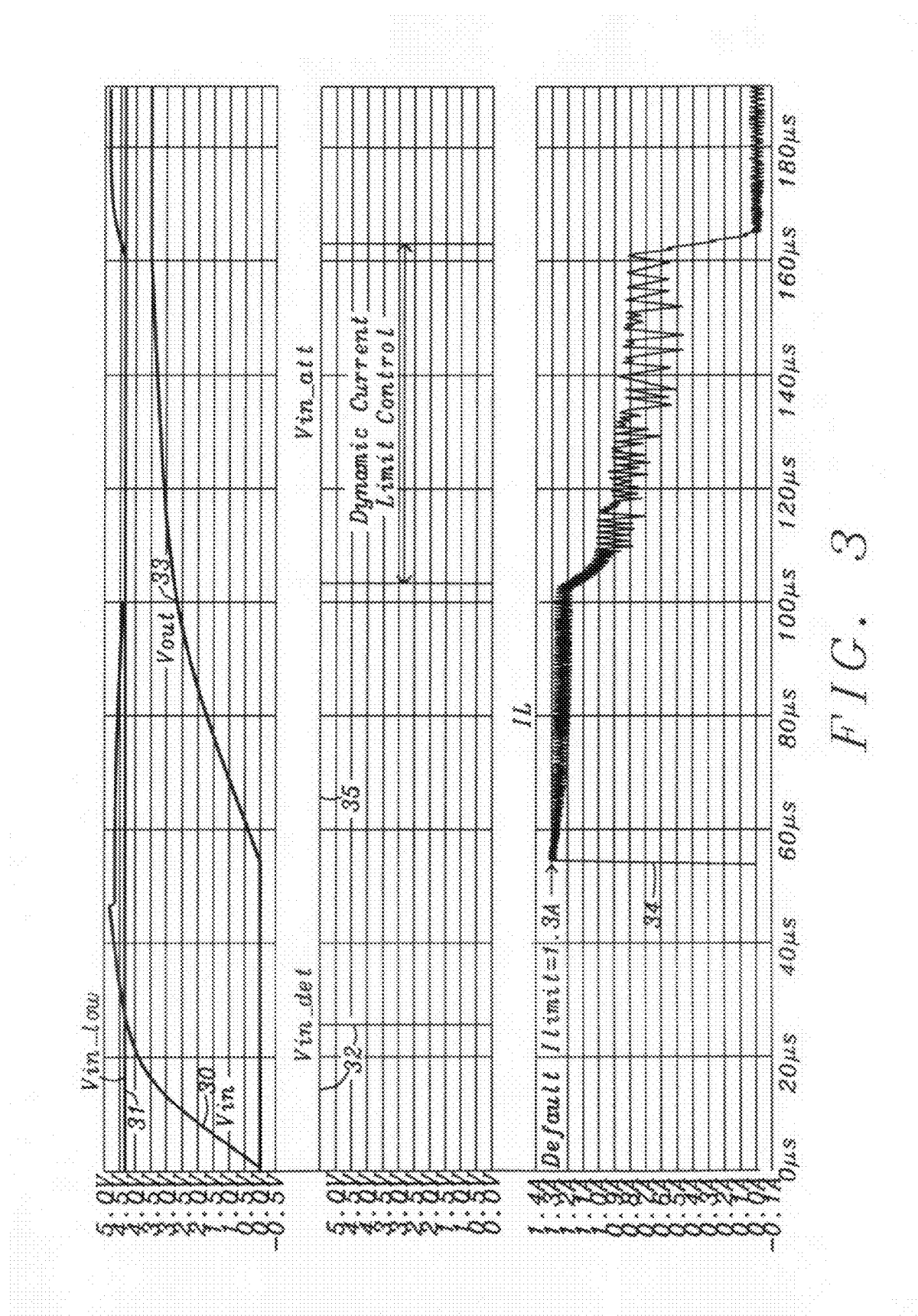
FIG. 3 illustrates a start-up sequence of a buck converter using the control scheme invented.

It should be noted that the method of the present invention can be applied not only for buck converter, it can be applied for has to be n FIG. 3 illustrates a start-up sequence of a buck converter using the control scheme invented having a power source with 1 Ohm output resistance (including cable resistance) is plugged in. The power source has a nominal output voltage of $V_{in}$=5V and a minimum output voltage of $V_{in\_low}$=4.4 V has been specified. Furthermore a peak current limit of $I_{limit}$=1.3 A has been programmed in the buck converter.

The power source is plugged in at t=1 us. At $T_1$=27 us the voltage $V_{in}$ 30 exceeds $V_{in\_low}$ 31, a power source is detected and the buck converter is enabled. After 20 us (time required for all the reference in the buck to settle) the buck driver is turned on and the capacitance $C_{out}$ 204 at $V_{out}$ node is charged via inductor 206 with a peak current of about 1.3 A. Because of the high current drawn and the relatively high power source output resistance the voltage at $V_{in}$ falls below $V_{in\_low}$ 31, and around t=100 us the output of comparator 25, $V_{in\_det}$ 32 is driven to 0. The buck is not disabled but the current limit is lowered by the control scheme described above, accordingly current $I_L$ through the main switch 21 is reduced and $V_{in}$ is kept within a controlled threshold below $V_{in\_low}$ 31. It should be noted that $V_{in\_att}$ 35, the output voltage of comparator 203, remains constant, even during the time interval when $V_{in\_det}$ 32, the output voltage of comparator 25, goes to zero because voltage $V_{in}$ 30 equals the threshold voltage $V_{inlow}$ 31.

In this way, despite of the source high output resistance and the high programmed current limit the buck is not affected by an unwanted disable and the start-up is successfully completed.

It should be noted that the operations of gates 27-28 and of latch could be integrated in the buck control unit 20.

Furthermore it should be noted that all components, except the coil and capacitors are integrated in an IC.

Figure 1:
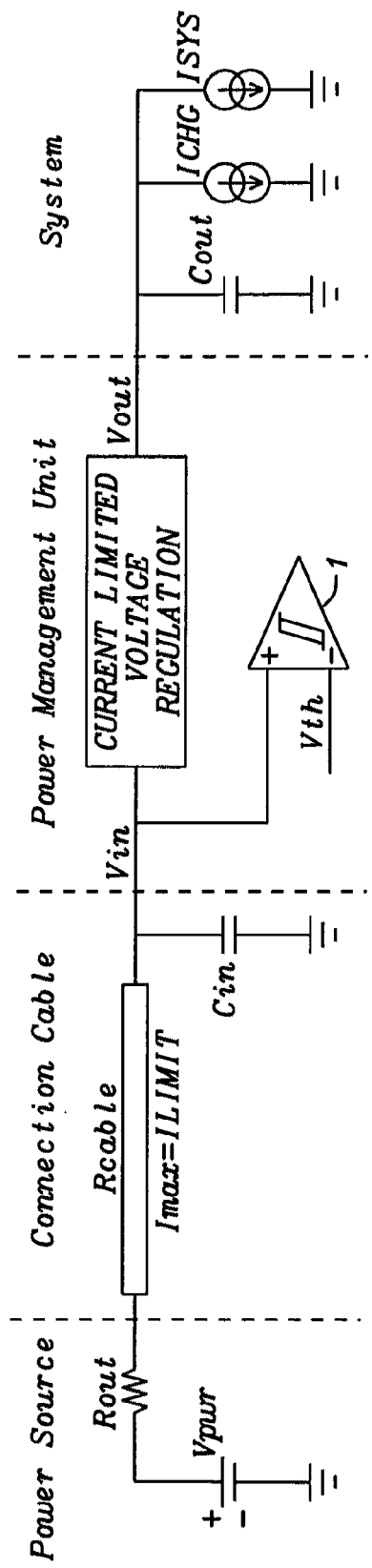
FIG. 1 prior art illustrates a current practice of an over-current protection and under-voltage protection scheme.
Figure 4:
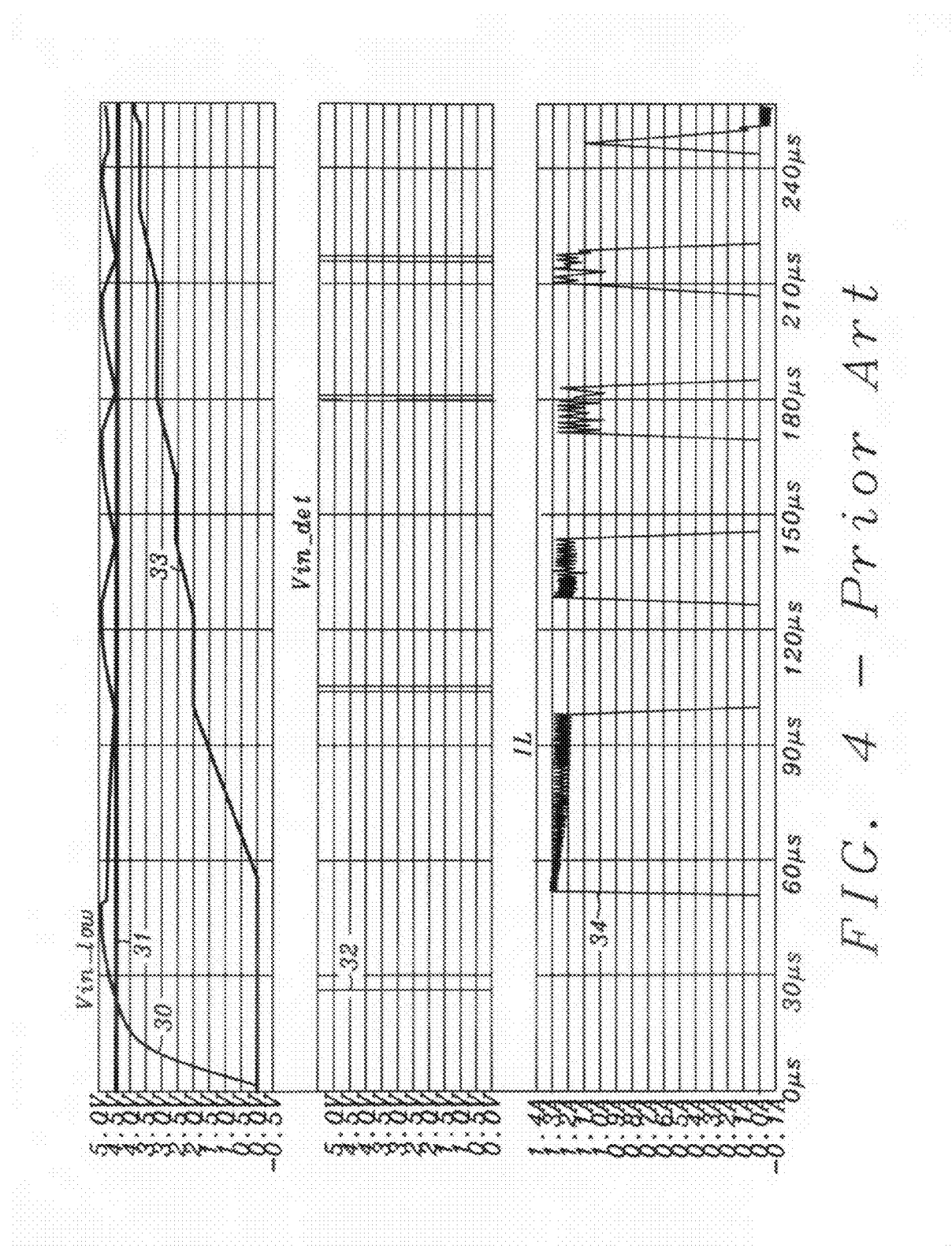
FIG. 4 illustrates a start-up sequence of a buck converter using prior art control.

The same start-up sequence as illustrated in FIG. 3 is shown in FIG. 4 prior art using the prior-art scheme shown in FIG. 1 prior art (the same parameters as in FIG. 3 are applied). In this case, the drop on $V_{in}$ 30 causes the buck converter to be shutdown and again re-enabled 4 times before $V_{out}$ 33 reaches its steady state voltage.

FIG. 3 demonstrates the advantage of the present invention versus prior art using the example of a start-up sequence. It has to be understood that the start-up sequence is only an example because also during operation the advantages versus prior art of the power management unit invented are obvious whenever a high system load (but below the programmed current limit) causes unwanted shutdown of the power management unit.

Figure 5:
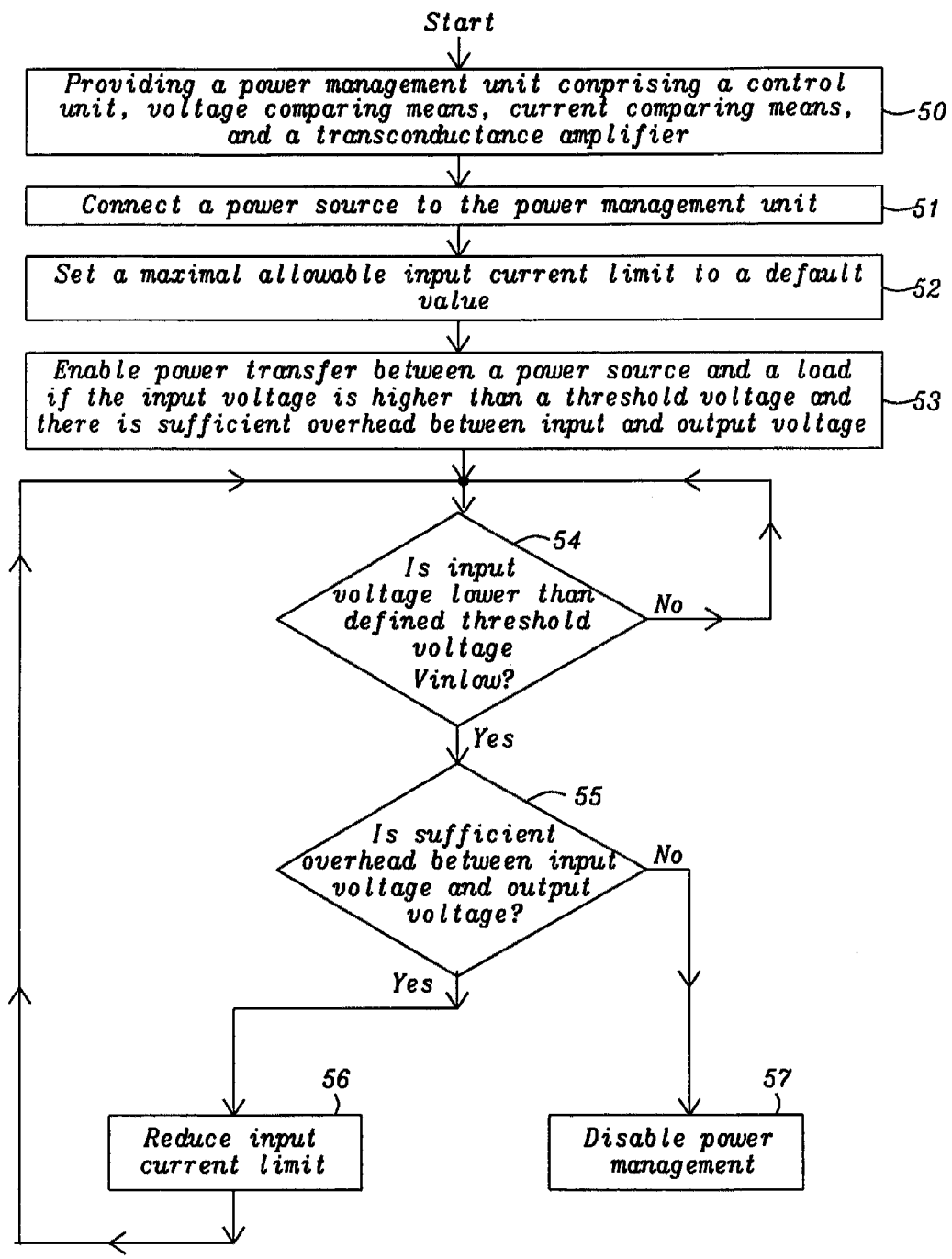
FIG. 5 illustrates a flowchart of a method invented to maximize the power transferred by a power management unit to a battery-operated system

FIG. 5 illustrates a flowchart of a method invented to maximize the power transferred by a power management unit to a battery-operated system. A first step 50 describes the provision of a power management unit comprising a control unit, voltage comparing means, current comparing means, and a controlled current source such as e.g. a transconductance amplifier. The following step 51 illustrates connecting a power source to the power management unit. The next step 52 depicts setting a maximal allowable input current limit to a default value and then in step 53 power transfer between a power source and a load is enabled if the input voltage is higher than a threshold voltage and there is sufficient overhead between input voltage and output voltage. Step 54 is a check if the input voltage of the power management unit is lower than a defined threshold voltage $V_{in\_low}$ and, if so, the process flow goes to step 55, otherwise the process flow goes back to repeat the check of step 54. Step 55 is a check if there is sufficient overhead between the input voltage and output voltage and, if so, the process flow goes to step 56, otherwise the process flow goes to step 57. In step 56 the input current limit is reduced and the process flow goes back to the check of step 54. Step 57 describes disabling of the power management unit.

In a preferred embodiment of the invention the reduction of the input current limit of step 56 causes an increase of the input voltage by reducing the voltage drop across the internal resistance of the power source and across the interconnection between power source and the power management unit. The maximal allowable input current limit could optionally be ramped up to a certain extent if required.

It should be noted that the same method as outlined above could be applied to linear DC-to-DC converters such as LDOs.

While the invention has been particularly shown and described with reference to the preferred embodiments thereof, it will be understood by those skilled in the art that various changes in form and details may be made without departing from the spirit and scope of the invention.

What is claimed is:

1. A method for dynamic adjustment of a current limit of a power management unit comprising the steps of:

(1) providing a power management unit comprising a control unit, voltage comparing means, current comparing means, and a controlled current source;
(2) connecting a power source to the power management unit;
(3) setting a maximal allowable input current limit to a default value;
(4) enabling power transfer between a power source and a load if the input voltage is higher than a threshold voltage and there is sufficient overhead between input voltage and output voltage;
(5) checking if an input voltage is lower than a defined threshold voltage $V_{in\_low}$ and, if so, go to step (6), else repeat step (5);
(6) checking if there is sufficient overhead between input voltage and output voltage if so, go to step (7), otherwise go to step (8);
(7) reducing input current limit and go to step (5); and
(8) disabling the power management unit.

2. The method of claim 1 wherein said reducing input current limit is performed via pushing current to a load current by said current source in the power management unit and achieves an increase of input voltage.

3. The method of claim 2 wherein said current source is a transconductance amplifier.

4. The method of claim 1 wherein said power management unit is a buck converter.

5. The method of claim 1 wherein said power management unit is a low drop-out converter.

6. The method of claim 1 wherein said overhead voltage is defined by a voltage value by which the input voltage is higher than the output voltage.

7. The method of claim 1 wherein an input current of the power management unit is controlled in a way that it must not exceed a defined maximum current limit.

8. The method of claim 1 wherein a maximal allowable input current limit is set by a reference current representing the maximal current limit, wherein this reference current is generated by the control unit.

9. The method of claim 7 wherein said input current is controlled cycle-by-cycle.

10. A power management unit enabled for dynamic adjustment of an input current limit comprising:
a first voltage comparator, comparing an input voltage of the power management unit with a threshold voltage, wherein its output is used by a means of setting dynamically a maximum input current limit;
a second voltage comparator, comparing an output voltage of the power management unit increased by an overhead voltage with said input voltage wherein its output is used by said means of setting dynamically a maximum input current limit;
a current comparator, comparing said input current with a reference current wherein its output is an input to said means of setting dynamically a maximum input current limit;
a means to limit said input current controlled by said means of setting dynamically a maximum input current limit; and
said means of setting dynamically a maximum input current limit, wherein said maximum current limit depends upon the outputs of said first and second voltage comparators.

11. The system of claim 10 wherein said power management unit is a buck converter.

12. The system of claim 10 wherein said means of setting dynamically a maximum input current limit comprises:
a control unit controlling the operation of the power management unit;
a controllable current source for said reference current, wherein the current source is controlled by said control unit;
a gm-amplifier adding a current to said reference if the input voltage of the power management unit is lower than said threshold voltage; and
a means of logical functions, enabling operation of the power management unit if said input voltage of the power management unit is higher than said threshold voltage and said output voltage of the power management unit increased by an overhead voltage is higher than said input voltage and wherein said means of logical functions is disabling operation of the power management unit if said input voltage of the power management unit is lower than said threshold voltage and said output voltage of the power management unit increased by an overhead voltage is lower than said input voltage.

13. The system of claim 12 wherein said means of logical functions comprises
a first AND-gate having inputs and an output, wherein a first input is the output of said first voltage comparator and a second input is the output of said second voltage comparator and its output is connected to a SET input of a S/R latch;
a second AND-gate having inputs and an output, wherein a first input is the inverted output of said first voltage comparator and a second input is the inverted output of said second voltage comparator and its output is connected to a RESET input of said S/R latch; and
said S/R latch, wherein its output is connected to said control unit.

* * * * *